(12) United States Patent
Matsuno et al.

(10) Patent No.: US 7,677,029 B2
(45) Date of Patent: Mar. 16, 2010

(54) REGENERATION CONTROLLER FOR EXHAUST PURIFICATION APPARATUS OF INTERNAL COMBUSTION ENGINE

(75) Inventors: Shigehiro Matsuno, Toyota (JP); Tatsuhisa Yokoi, Toyota (JP); Yasuhiko Otsubo, Toyota (JP); Hiroki Matsuoka, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 467 days.

(21) Appl. No.: 10/591,044

(22) PCT Filed: Mar. 10, 2005

(86) PCT No.: PCT/JP2005/004734

§ 371 (c)(1),
(2), (4) Date: Aug. 29, 2006

(87) PCT Pub. No.: WO2005/088096

PCT Pub. Date: Sep. 22, 2005

(65) Prior Publication Data

US 2007/0137180 A1 Jun. 21, 2007

(30) Foreign Application Priority Data

Mar. 11, 2004 (JP) .............................. 2004-068991

(51) Int. Cl.
*F01N 3/00* (2006.01)
(52) U.S. Cl. ............................ 60/295; 60/277; 60/297; 60/311
(58) Field of Classification Search .................. 60/297, 60/311, 277, 295, 300
See application file for complete search history.

(56) References Cited

U.S. PATENT DOCUMENTS

| 6,438,948 B2 * | 8/2002 | Ono et al. ...................... 60/311 |
| 6,735,941 B2 * | 5/2004 | Saito et al. .................... 60/295 |
| 6,758,039 B2 * | 7/2004 | Kuboshima et al. ........... 60/311 |
| 6,907,873 B2 * | 6/2005 | Hamahata ................... 123/676 |
| 6,912,847 B2 * | 7/2005 | Deeba .......................... 60/297 |
| 7,147,688 B2 * | 12/2006 | Kondou et al. .................... 95/1 |
| 2003/0230077 A1 | 12/2003 | Kuboshima et al. |

FOREIGN PATENT DOCUMENTS

| FR | 2 829 798 | 3/2003 |
| JP | 60-153414 | 8/1985 |
| JP | 3-1996140 | 8/1991 |
| JP | 2002-303123 A | 10/2002 |
| JP | 2003-020930 | 1/2003 |

* cited by examiner

*Primary Examiner*—Tu M Nguyen
(74) *Attorney, Agent, or Firm*—Kenyon & Kenyon LLP

(57) ABSTRACT

A regeneration controller for an exhaust purification apparatus (36, 38) of an engine (2) that appropriately burns particulate matter accumulated in the exhaust purification apparatus. The regeneration controller includes an ECU (70) that determines whether an estimated accumulation amount (PMsm) of particulate matter deviates from an actual accumulation amount. When the estimated accumulation amount is less than or equal to a maximum value (BUpm) and an exhaust pressure difference (&Dgr;P/GA) is greater than a replacement reference value (Dp), the ECU replaces the estimated accumulation amount with a greater replacement amount (UPpm). This causes the estimated accumulation amount to approach or to be the same as the actual accumulation amount.

23 Claims, 11 Drawing Sheets

US 7,677,029 B2

REGENERATION CONTROLLER FOR EXHAUST PURIFICATION APPARATUS OF INTERNAL COMBUSTION ENGINE

This is a 371 national phase application of PCT/JP2005/004734 filed 10 Mar. 2005, claiming priority to Japanese Patent Application No. 2004-068991 filed 11 Mar. 2004, the contents of which are incorporated herein by reference.

FIELD OF THE INVENTION

The present invention relates to a regeneration controller for an exhaust purification apparatus of an internal combustion engine. In particular, the present invention relates to a regeneration controller that decomposes and eliminates particulate matter accumulated in the exhaust purification apparatus by heating the exhaust purification apparatus.

BACKGROUND OF THE INVENTION

Japanese Laid-Open Patent Publication No. 2003-20930 describes a technique for burning particulate matter (PM) accumulated in a filter, which is arranged in an exhaust passage of a diesel engine, when the amount of PM accumulated in the filter exceeds a predetermined amount. The PM accumulated in the filter is burned by heating the filter and intermittently adjusting the air-fuel ratio to the lean side. In this prior art, the amount of PM accumulated in the filter is estimated by cyclically adding the amount of PM emitted from the engine and the amount of PM oxidized in the filter based on the driving state of the engine.

When the engine driving state is changing, the actual PM emission amount and the PM oxidation amount may not be the same and differ from each other. In particular, the estimated PM accumulation amount may be less than the actual PM accumulation amount. When the actual accumulation amount is greater than the estimated accumulation amount, the elimination of the accumulated PM may be insufficient. If such insufficient elimination is repeated, an excessively large amount of PM may be accumulated. In such a case, a greater amount of PM than intended may be rapidly burned. As a result, the filter would become overheated. This would cause thermal deterioration of the filter.

SUMMARY OF THE INVENTION

It is an object of the present invention to provide a controller that minimizes the difference between the estimated accumulation amount and the actual accumulation amount of particulate matter, while appropriately eliminating the particulate matter accumulated in an exhaust purification apparatus.

One aspect of the present invention is a regeneration controller for regenerating an exhaust purification apparatus that is arranged in an exhaust passage for an internal combustion engine. The exhaust purification apparatus includes an upstream purification portion and a downstream purification portion. The regeneration controller includes a difference detector for detecting at least one of a difference in exhaust pressure, between a first location upstream from the exhaust purification apparatus and a second location downstream from the exhaust purification apparatus, and a difference in exhaust temperature, between a third location upstream from the downstream purification portion of the exhaust purification apparatus and a fourth location downstream from the third location. A calculation section calculates an estimated accumulation amount of particulate matter in the exhaust purification apparatus. A heating control section heats the exhaust purification apparatus to eliminate the particulate matter from the exhaust purification apparatus when the estimated accumulation amount is greater than a reference accumulation amount. A replacement control section for replacing the estimated accumulation amount with a greater estimated accumulation amount when the estimated accumulation amount falls within a replacement determination reference range due to the heating and the at least one difference is greater than a replacement reference value.

Another aspect of the present invention is a regeneration controller for regenerating an exhaust purification apparatus that is arranged in an exhaust passage for an internal combustion engine. The exhaust purification apparatus includes an upstream purification mechanism and a downstream purification mechanism that are arranged in the exhaust passage. The regeneration controller includes a difference detector for detecting at least one of a difference in exhaust pressure and a difference in exhaust temperature between an upstream location and a downstream location of the downstream purification mechanism. A calculation section calculates an estimated accumulation amount of particulate matter in the exhaust purification apparatus. A heating control section heats the exhaust purification apparatus to eliminate the particulate matter from the exhaust purification apparatus when the estimated accumulation amount is greater than a reference accumulation amount. A replacement control section replaces the estimated accumulation amount with a greater estimated accumulation amount when the estimated accumulation amount falls within a replacement determination reference range due to the heating and the at least one difference is greater than a replacement reference value.

A further aspect of the present invention is a regeneration controller for regenerating an exhaust purification apparatus that is arranged in an exhaust passage for an internal combustion engine. The exhaust purification apparatus includes an upstream purification portion and a downstream purification portion. The regeneration controller includes a difference detector for detecting at least one of a difference in exhaust pressure, between a first location upstream from the exhaust purification apparatus and a second location downstream from the exhaust purification apparatus, and a difference in exhaust temperature, between a third location upstream from the downstream purification portion of the exhaust purification apparatus and a fourth location downstream from the third location. A calculation section calculates an estimated accumulation amount of particulate matter in the exhaust purification apparatus. A heating control section heats the exhaust purification apparatus to eliminate the particulate matter from the exhaust purification apparatus when the estimated accumulation amount is greater than a reference accumulation amount. A hold control section holds the estimated accumulation amount when the estimated accumulation amount falls within a hold determination reference range due to the heating and the at least one difference is greater than a held reference value.

Another aspect of the present invention is a regeneration controller for regenerating an exhaust purification apparatus that is arranged in an exhaust passage for an internal combustion engine. The exhaust purification apparatus includes an upstream purification mechanism and a downstream purification mechanism that are arranged continuously in the exhaust passage. The regeneration controller includes a difference detector for detecting at least one of a difference in exhaust pressure and a difference in exhaust temperature between an upstream location and a downstream location of the downstream purification mechanism. A calculation section calculates an estimated accumulation amount of particulate matter in the exhaust purification apparatus. A heating control section heats the exhaust purification apparatus to eliminate the particulate matter from the exhaust purification apparatus when the estimated accumulation amount is greater than a reference accumulation amount. A hold control section holds the estimated accumulation amount when the estimated accumulation amount falls within a hold determination reference range due to the heating and the at least one difference is greater than a held reference value.

A further aspect of the present invention is a regeneration controller for regenerating an exhaust purification apparatus that is arranged in an exhaust passage for an internal combustion engine. The exhaust purification apparatus includes an upstream purification portion and a downstream purification portion. The regeneration controller includes a difference detector for detecting at least one of a difference in exhaust pressure, between a first location upstream from the exhaust purification apparatus and a second location downstream from the exhaust purification apparatus, and a difference in exhaust temperature, between a third location upstream from the downstream purification portion of the exhaust purification apparatus and a fourth location downstream from the third location. A calculation section calculates an estimated accumulation amount of particulate matter in the exhaust purification apparatus. A heating control section heats the exhaust purification apparatus to eliminate the particulate matter from the exhaust purification apparatus when the estimated accumulation amount is greater than a reference accumulation amount. A particulate matter elimination continuation control section continues the heating until the at least one difference is reduced to be smaller than a continuance reference value when the estimated accumulation amount reaches a reference value for completing the heating and the at least one difference is greater than the continuance reference value.

Another aspect of the present invention is a regeneration controller for regenerating an exhaust purification apparatus that is arranged in an exhaust passage for an internal combustion engine. The exhaust purification apparatus includes an upstream purification mechanism and a downstream purification mechanism that are arranged continuously in the exhaust passage. The regeneration controller includes a difference detector for detecting at least one of a difference in exhaust pressure and a difference in exhaust temperature between an upstream location and a downstream location of the downstream purification mechanism. A calculation section calculates an estimated accumulation amount of particulate matter in the exhaust purification apparatus. A heating control section heats the exhaust purification apparatus to eliminate the particulate matter from the exhaust purification apparatus when the estimated accumulation amount is greater than a reference accumulation amount. A particulate matter elimination continuation control section continues the heating until the at least one difference is reduced to be smaller than a continuance reference value when the estimated accumulation amount reaches a reference value for completing the heating and the at least one difference is greater than the continuance reference value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

Figure 1:
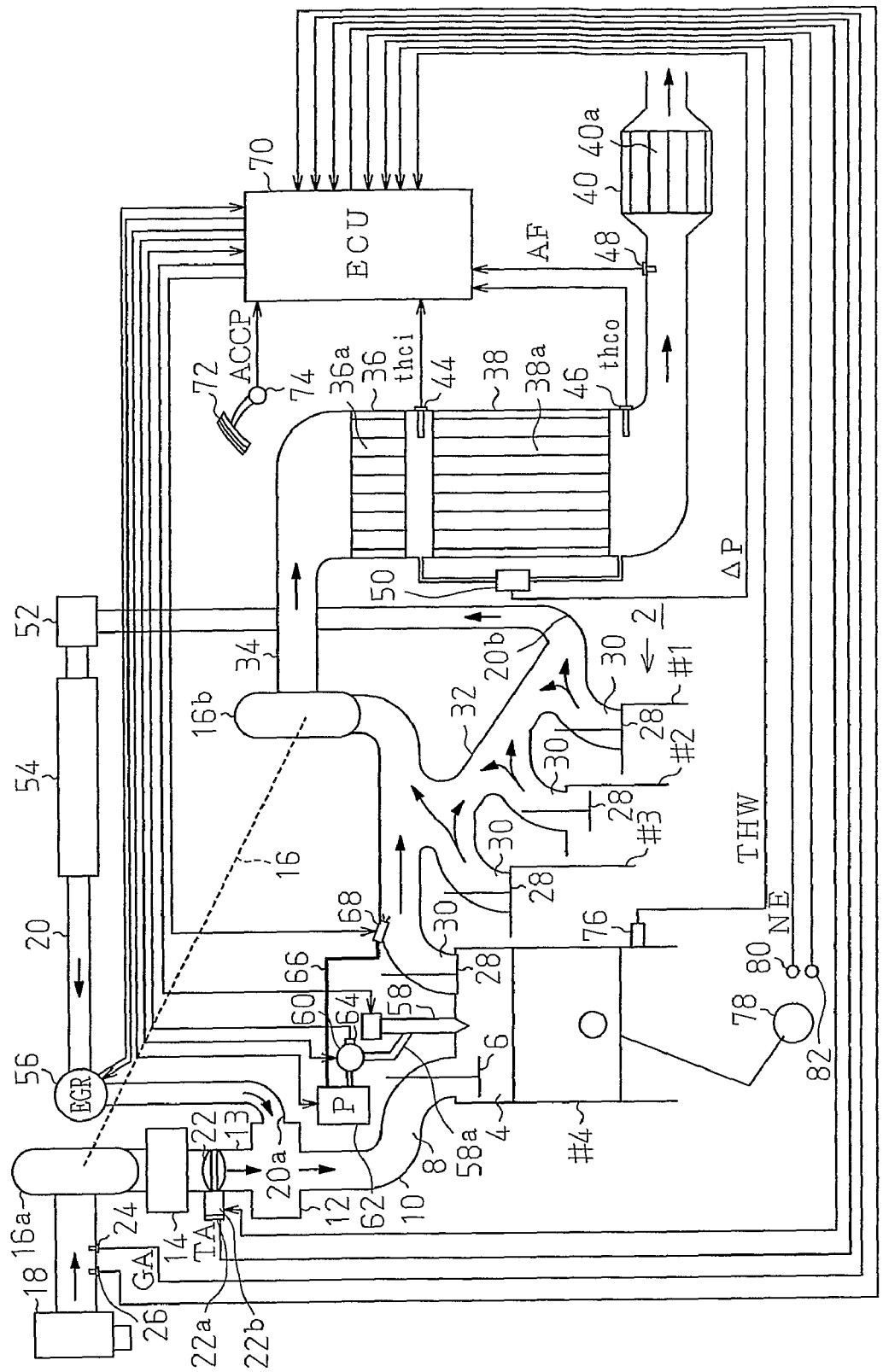
FIG. 1 is a schematic diagram of a control system for a vehicle diesel engine according to a first embodiment of the present invention.

A regeneration controller for an exhaust purification apparatus of an internal combustion engine according to a first embodiment of the present invention will now be discussed. FIG. 1 is a schematic diagram of a control system including the regeneration controller, which is applied to a vehicle diesel engine. The application of the regeneration controller of the present invention is not limited to a diesel engine. That is, the regeneration controller of the present invention is also applicable to a lean-burn gasoline engine.

A diesel engine 2 includes a plurality of cylinders including first to fourth cylinders #1, #2, #3, and #4. In each of the cylinders #1 to #4, a combustion chamber 4 is connected to a surge tank 12 via an intake port 8 and an intake manifold 10. Each intake port 8 is opened and closed by an intake valve 6. The surge tank 12 is connected to an intercooler 14 and a supercharger such as an exhaust turbocharger 16. Fresh air supplied via an air cleaner 18 is compressed by a compressor 16a of the exhaust turbocharger 16. The surge tank 12 has an EGR gas supply port 20a of an exhaust gas recirculation (EGR) passage 20. A throttle valve 22 is arranged in an intake passage 13 between the surge tank 12 and the intercooler 14. An intake air amount sensor 24 and an intake air temperature sensor 26 are arranged between the compressor 16a and the air cleaner 18.

In each of the cylinders #1 to #4, the combustion chamber 4 is connected to an exhaust port 30 and an exhaust manifold 32. Each exhaust port 30 is opened and closed by an exhaust valve 28. An exhaust turbine 16b of the exhaust turbocharger 16 is arranged between the exhaust manifold 32 and the exhaust passage 34. The exhaust is sent into the exhaust turbine 16b from a position in the exhaust manifold 32 close to the fourth cylinder #4.

Three exhaust purification mechanisms, each accommodating an exhaust purification catalyst, namely, catalytic converters 36, 38, and 40, are arranged in the exhaust passage 34. The first catalytic converter 36, which is positioned the furthest upstream, accommodates a NOx storage reduction catalyst 36a. When the exhaust of the diesel engine 2, which is operating normally, is in an oxidation atmosphere (lean), NOx is stored in the NOx storage reduction catalyst 36a. When the exhaust is in a reduction atmosphere (stoichiometric or air-fuel ratio being lower than that the stoichiometric condition), the NOx stored in the NOx storage reduction catalyst 36a is reduced to NO, separated from the NOx storage reduction catalyst 26a, and further reduced using HC and CO. In this way, NOx is eliminated.

The second catalytic converter 38, which is arranged downstream from the first catalytic converter 36, accommodates a filter 38a having a monolithic structure. Walls of the filter 38a have pores that permit the passage of exhaust. The porous wall surface of the filter 38a is coated with a layer of a NOx storage reduction catalyst. The filter 38a functions as a base for the NOx storage reduction catalyst layer. The NOx storage reduction catalyst layer eliminates NOx in the same manner as the NOx storage reduction catalyst 36a. Particulate matter (PM) contained in the exhaust is accumulated in the wall of the filter 38a. The PM is first oxidized by active oxygen released when NOx is exposed in an oxidation atmosphere under a relatively high temperature. Then, the PM is entirely oxidized by the surrounding excess oxygen. In this way, not only NOx but also PM is eliminated from the filter 38a. The first catalytic converter 36 is formed integrally with the second catalytic converter 38. The first catalytic converter 36 may be formed separately from the second catalytic converter 38.

The third catalytic converter 40, which is positioned most downstream, accommodates an oxidation catalyst 40a for eliminating HC and CO through oxidation. A first exhaust temperature sensor 44 is arranged between the NOx storage reduction catalyst 36a and the filter 38a. Between the filter 38a and the oxidation catalyst 40a, a second exhaust temperature sensor 46 is arranged near the filter 38a, and an air-fuel ratio sensor 48 is arranged near the oxidation catalyst 40a.

The air-fuel ratio sensor 48 is, for example, a sensor using a solid electrolyte. The air-fuel ratio sensor 48 detects the air-fuel ratio of the exhaust based on exhaust components and generates a voltage signal, which is linearly proportional to the air-fuel ratio. The first exhaust temperature sensor 44 and the second exhaust temperature sensor 46 respectively detect exhaust temperatures thci and thco at their respective locations.

A pressure difference sensor 50 is connected to a pipe connecting the upstream side and downstream side of the filter 38a. The pressure difference sensor 50 detects the pressure difference ΔP between the upstream and downstream sides of the filter 38a to detect the clogging degree of the filter 38a, that is, the degree of accumulation of PM in the filter 38a.

The exhaust manifold 32 has an EGR gas inlet 20b of the EGR passage 20 located near the first cylinder #1, or distant from the fourth cylinder #4 that sends exhaust into the exhaust turbine 16b. An iron EGR catalyst 52 for reforming the EGR gas, a cooler 54 for cooling the EGR gas, and an EGR valve 56 are arranged in the EGR passage 20 in this order from the EGR gas inlet 20b. The EGR catalyst 52 also functions to prevent clogging of the cooler 54. The amount of EGR gas that is to be supplied again to the intake system via the EGR gas supply port 20a is adjusted according to the opening degree of the EGR valve 56.

A fuel injection valve 58 is arranged in each of the cylinders #1 to #4 and directly injects fuel into the corresponding combustion chamber 4. Each fuel injection valve 58 is connected to a common rail 60 via a fuel supply pipe 58a. A variable discharge amount fuel pump 62, which is electrically controlled, supplies high-pressure fuel into the common rail 60. The high-pressure fuel in the common rail 60 is distributed to the corresponding fuel injection valve 58 via each fuel supply pipe 58a. A fuel pressure sensor 64 detects the pressure of fuel in the common rail 60.

The fuel pump 62 supplies low-pressure fuel to a fuel adding valve 68 via a fuel supply pipe 66. The fuel adding valve 68 is arranged in an exhaust port 30 of the fourth cylinder #4 to inject fuel toward the exhaust turbine 16b. The fuel adding valve 68 adds fuel to the exhaust in a catalyst control mode.

An electronic control unit (ECU) 70 includes a digital computer system including a CPU, a ROM, a RAM, and drive circuits. The drive circuit drives various units. The ECU 70 is provided with detection signals from the intake air amount sensor 24, the intake air temperature sensor 26, the first exhaust temperature sensor 44, the second exhaust temperature sensor 46, the air-fuel ratio sensor 48, the pressure difference sensor 50, an EGR opening degree sensor included in the EGR valve 56, a fuel pressure sensor 64, a throttle opening degree sensor 22a, an accelerator opening degree sensor 74, a coolant temperature sensor 76, an engine speed sensor 80, and a cylinder distinction sensor 82. The accelerator opening degree sensor 74 detects the depressed amount of an accelerator pedal 72 (accelerator opening degree ACCP). The coolant temperature sensor 76 detects the coolant temperature THW of the diesel engine 2. The engine speed sensor 80 detects the engine speed NE, or rotation speed of the crankshaft 78. The cylinder distinction sensor 82 detects the rotational phase of the crankshaft 78 or the rotational phase of an intake cam to distinguish cylinders.

The ECU 70 determines the driving state of the engine from these detection signals to control fuel injection (amount and timing) of the fuel injection valves 58 according to the driving state of the engine. The ECU 70 executes control for adjusting the opening degree of the EGR valve 56, adjusting the throttle opening degree with a motor 22b, and adjusting the discharge amount of the fuel pump 62. Further, the ECU 70 executes catalyst control including a regeneration mode, a sulfur components decomposition-release mode (hereinafter referred as a sulfur elimination mode), a NOx reduction mode, and a normal control mode. The catalyst control will be described later.

The ECU 70 executes a combustion mode selected from two combustion modes, namely, a normal combustion mode and a low temperature combustion mode, according to the driving state of the engine. In the low temperature combustion mode, the ECU 70 simultaneously reduces NOx and smoke by slowing the increase of the combustion temperature by using a large recirculation amount of exhaust based on an EGR valve opening degree map for the low temperature combustion mode. The low temperature combustion mode is executed when the engine is in a range in which the engine load is low and the engine speed is low or intermediate. In the low temperature combustion mode, the ECU 70 executes air-fuel ratio feedback control including adjustment of a throttle opening degree TA based on the air-fuel ratio AF detected by the air-fuel ratio sensor 48. A combustion mode other than the low temperature combustion mode is the normal combustion mode. In the normal combustion mode, the ECU 70 executes normal EGR control (including control that involves no recirculation of the exhaust) based on an EGR valve opening degree map for the normal combustion mode.

The catalyst control will now be described.

In the regeneration mode, the ECU 70 particularly heats PM accumulated in the filter 38a of the second catalytic converter 38 when the estimated accumulation amount of PM in the exhaust purification catalyst reaches a regeneration reference value. The PM is heated to be oxidized and decomposed to generate $CO_2$ and $H_2O$ and is released as $CO_2$ and $H_2O$. In the regeneration mode, the ECU 70 repeatedly adds fuel with the fuel adding valve 68 to heat (e.g., 600 to 700° C.) the catalyst bed at an air-fuel ratio that is higher than the stoichiometric air-fuel ratio. The ECU 70 may further perform fuel injection (after injection) in each combustion chamber 4 with the corresponding fuel injection valve 58 during the power stroke or the exhaust stroke. The ECU 70 further executes burn-up heating by executing an intermittent fuel adding process under a specific condition, which will be described later. In the intermittent fuel adding process, the ECU 70 executes an air-fuel ratio lowering process during a period in which no fuel is added. The air-fuel ratio lowering process lowers the air-fuel ratio to be the same as or slightly lower than the stoichiometric air-fuel ratio by intermittently adding fuel from the fuel adding valve 68. In this embodiment, the air-fuel ratio lowering process enriches the air-fuel ratio to be slightly lower than the stoichiometric air-fuel ratio. In certain cases, the after injection with the fuel injection valves 58 and the intermittent fuel adding process may be performed in combination. In the regeneration mode, the PM clogging at the front surface of the NOx storage reduction catalyst 36a is eliminated and the PM accumulated in the filter 38a at an accumulation amount greater than the estimated accumulation amount is burned and is completely eliminated.

The sulfur elimination mode is executed when the NOx storage reduction catalyst 36a and the filter 38a are poisoned by sulfur components and their exhaust purification capacity such as NOx storage capacity is lowered. The sulfur elimination mode decomposes and releases sulfur components from the NOx storage reduction catalyst 36a and the filter 38a so that the NOx storage reduction catalyst 36a and the filter 38a are rid of sulfur components and restored from sulfur poisoning. In the sulfur elimination mode, the ECU 70 heats the catalyst bed (e.g., to 650° C.) by repeatedly adding fuel from the fuel adding valve 68. The ECU 70 further executes an air-fuel ratio lowering process that lowers the air-fuel ratio to be the same as or slightly lower than the stoichiometric air-fuel ratio by intermittently adding fuel from the fuel adding valve 68. In the first embodiment, the air-fuel ratio lowering process enriches the air-fuel ratio to be slightly lower than the stoichiometric air-fuel ratio. In the sulfur elimination mode, the after injection using the fuel injection valve 58 may also be executed. This process is similar to the intermittent fuel adding process executed under a specific condition in the regeneration mode and also has the effect of burning up the PM.

In the NOx reduction mode, NOx occluded in the NOx storage reduction catalyst 36a and the filter 38a is reduced to $N_2$, $CO_2$, and $H_2O$, and is released as $N_2$, $CO_2$, and $H_2O$. In the NOx reduction mode, the ECU 70 intermittently adds fuel from the fuel adding valve 68 at relatively long time intervals so that the temperature of the catalyst bed is set relatively low (e.g., 250 to 500° C.). At such a relatively low catalyst bed temperature, the air-fuel ratio is lowered to be the same as or slightly lower than the stoichiometric air-fuel ratio.

The catalyst control excluding the three catalyst control modes described above is the normal control mode. In the normal control mode, the ECU 70 does not perform the fuel addition with the fuel adding valve 68 and the after injection with the fuel injection valve 58.

Figure 2:
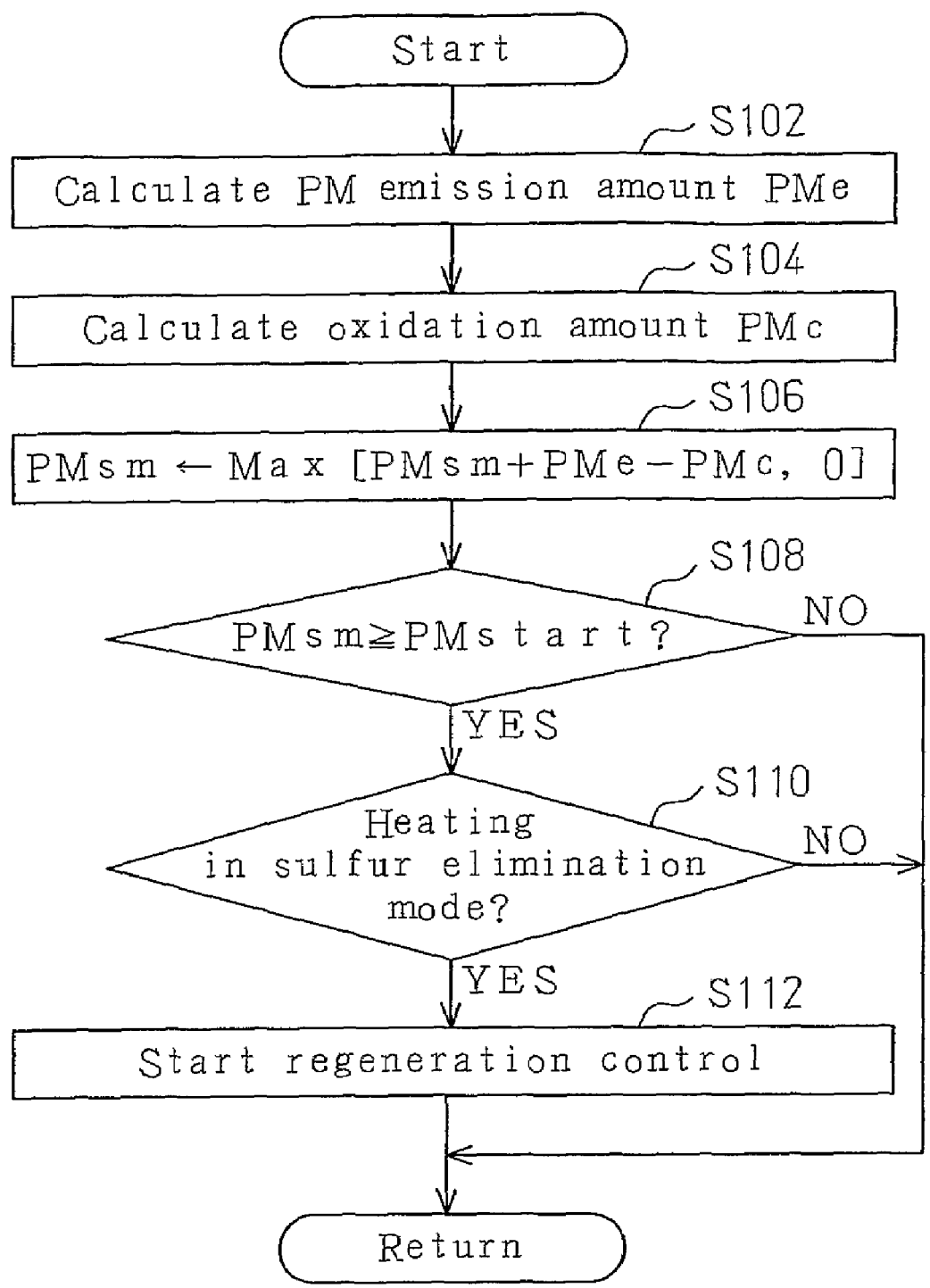
FIG. 2 is a flowchart of a regeneration mode execution determination executed by the ECU shown in FIG. 1.
Figure 3:
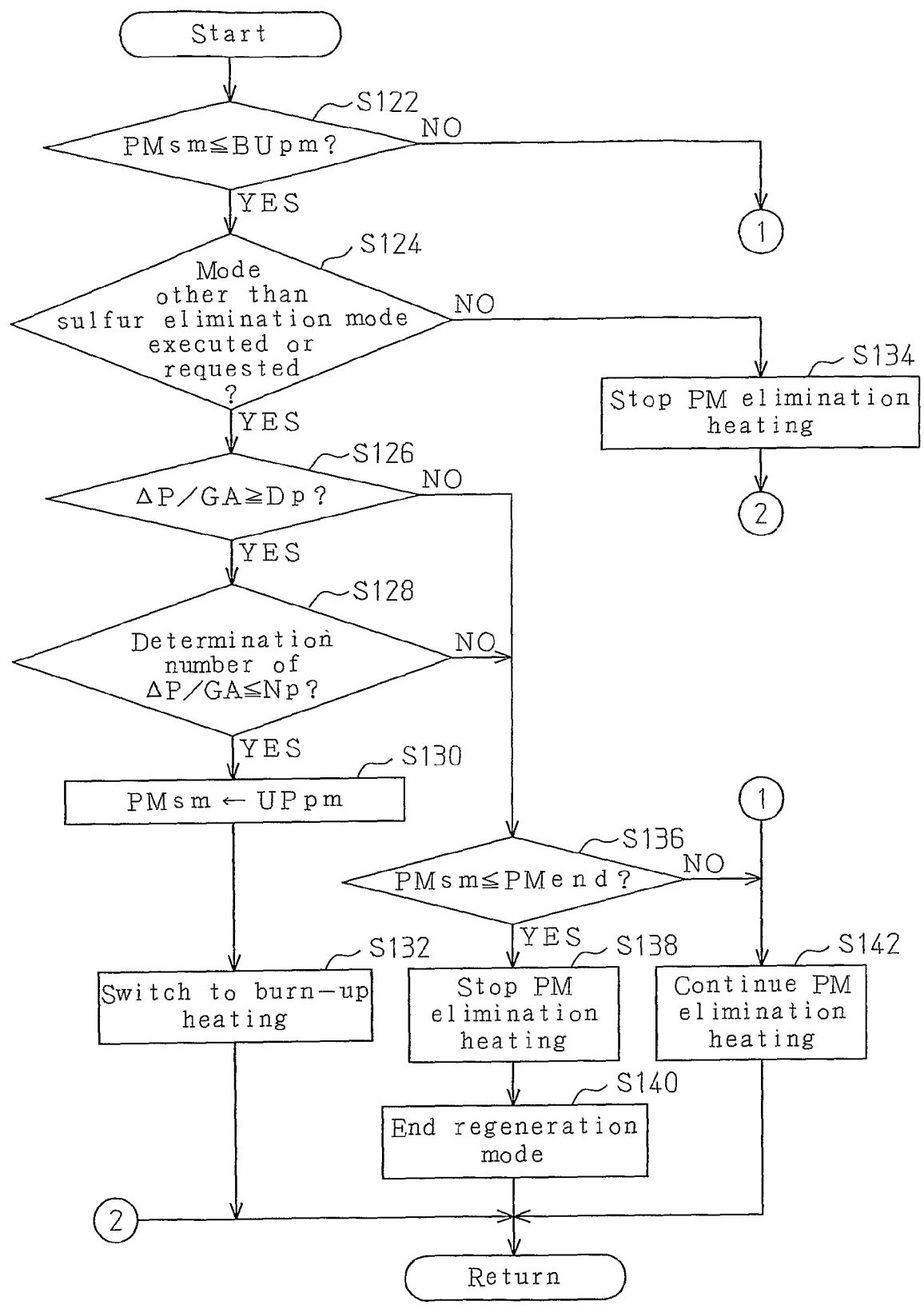
FIG. 3 is a flowchart of regeneration control executed by the ECU shown in FIG. 1.

The processing executed by the ECU 70 in the regeneration mode will now be discussed. The flowchart of FIG. 2 showing the regeneration mode execution determination and the flowchart of FIG. 3 showing the regeneration control are each executed as interrupts in predetermined time cycles. The result of the regeneration mode execution determination in FIG. 2 determines whether to start the regeneration control in FIG. 3.

The regeneration mode execution determination (FIG. 2) will first be described.

In step S102, the ECU 70 calculates the particulate matter emission amount PMe, which is the total amount of PM emitted from each combustion chamber 4 of the diesel engine 2 during one control cycle in FIG. 2. In this embodiment, the ECU 70 calculates the particulate matter emission amount PMe by referring to a map, which is generated in advance through experiments. The map associates the emission amount with, for example, the engine speed NE and with the engine load (e.g., the fuel injection amount of the fuel injection valve 58). The ECU 70 calculates the particulate matter emission amount PMe from the engine speed NE and the engine load.

In step S104, the ECU 70 calculates the oxidation amount PMc of PM that is accumulated or trapped in the filter 38a. The oxidation amount PMc is the amount of the trapped PM that is eliminated through oxidation during one control cycle of this process. In the first embodiment, the ECU 70 calculates the oxidation amount PMc by referring to a map, which is generated in advance through experiments. The map associates the oxidation amount with the catalyst bed temperature of the filter 38a (e.g., the exhaust temperature thco detected by the second exhaust temperature sensor 46) and with an intake air amount GA. The ECU 70 calculates the oxidation amount PMc from the exhaust temperature thco and the intake air amount GA.

In step S106, the ECU 70 calculates an estimated PM accumulation amount PMsm using expression 1.

$$PMsm \leftarrow Max[PMsm+PMe-PMc, 0] \quad (1)$$

In expression 1, the estimated accumulation amount PMsm in the right side is the value calculated in the previous cycle of this process. Max represents an operator for extracting the maximum value of the values in the parentheses. For example, when PMsm+PMe−PMc is a positive value, the resulting value of PMsm+PMe−PMc is entered as the estimated accumulation amount PMsm at the left side of the expression. When PMsm+PMe−PMc is a negative value, zero (grams) is entered as the estimated accumulation amount PMsm at the left side of the expression.

In step S108, the ECU 70 checks whether the estimated accumulation amount PMsm is greater than or equal to a regeneration reference value PMstart (corresponding to a reference accumulation amount) and determines whether to start the regeneration mode. When PMsm is less than PMstart (NO in step S108), the ECU 70 temporarily terminates this process. The state in which PMsm is less than PMstart corresponds to a state before timing t0 shown in the timing chart of FIG. 4.

When the state in which PMe is greater than PMc continues due to the driving state of the diesel engine 2, steps S102, S104, and S106 is repeated. This gradually increases the estimated accumulation amount PMsm. However, as long as PMsm is less than PMstart (NO in step S108), the ECU 70 temporarily terminates this process.

When the estimated accumulation amount PMsm increases and satisfies PMsm≧PMstart (YES in step S108), the ECU 70 determines whether heating for PM elimination in the sulfur elimination mode has stopped. When the PM elimination heating in the sulfur elimination mode has stopped (NO in step S110), the ECU 70 temporarily terminates this process. When the PM elimination heating in the sulfur elimination mode is being performed (YES in step S110), the ECU 70 starts the regeneration control (step S112, t0 in FIG. 4). In this case, the regeneration control shown in FIG. 3 is executed cyclically.

The regeneration control will now be described with reference to FIG. 3. The ECU 70 executes the regeneration control after executing the regeneration mode execution determination in FIG. 2. Thus, the regeneration control is executed in the same cycle as the regeneration mode execution determination.

Figure 4:
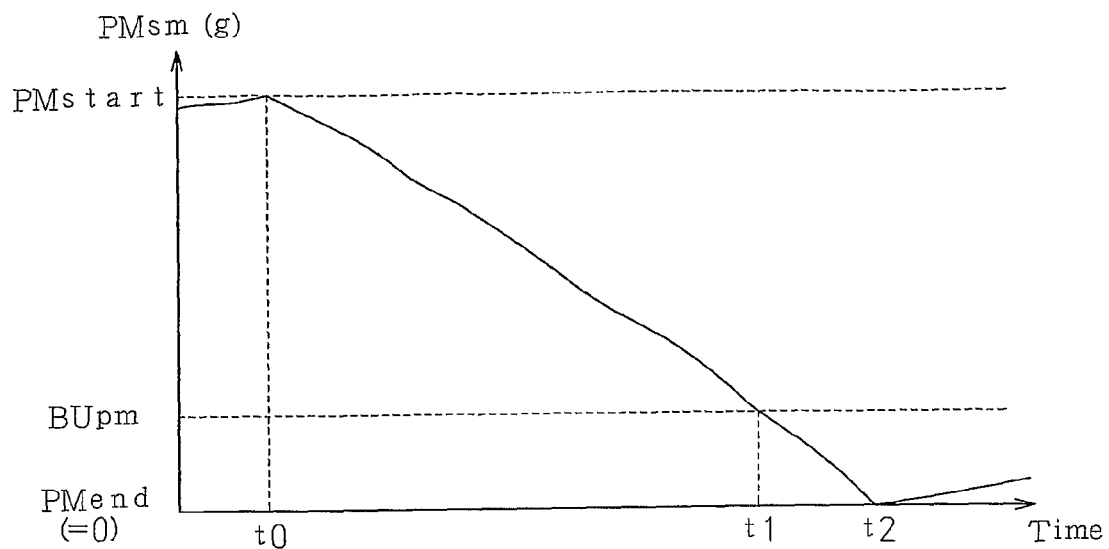
FIGS. 4 and 5 are timing charts of the regeneration control according to the first embodiment.

In step S122, the ECU 70 determines whether the estimated accumulation amount PMsm calculated in the previous cycle is within a replacement determination reference range (less than or equal to a maximum value BUpm of the replacement determination reference range). As shown in FIG. 4, the maximum value BUpm is much smaller than the regeneration reference value PMstart and slightly greater than a termination determination value PMend (e.g., 0 grams).

When PMsm is greater than BUpm (NO in step S122, t0 to t1 in FIG. 4), the ECU 70 sets (instructs) initiation of the PM elimination heating in step S142 and temporarily terminates this process. In the PM elimination heating, the fuel adding valve 68 repeatedly adds fuel in the manner described above. This exposes the catalyst to an atmosphere in which the air-fuel ratio is higher than the stoichiometric air-fuel ratio and raises the catalyst bed temperature (exhaust temperature thci) (e.g., 600 to 700° C.). Then, the particulate matter emission amount PMe becomes less than the oxidation amount PMc, and the estimated accumulation amount PMsm decreases gradually.

As long as PMsm is greater than BUpm (NO in step S122), the process for eliminating PM by the fuel addition described above is continued.

The estimated accumulation amount PMsm gradually decreases and approaches the termination determination value PMend. When the estimated accumulation amount PMsm decreases and satisfies PMsm≦BUpm (YES in step S122), the ECU 70 determines whether a mode other than the sulfur elimination mode is presently being executed and whether a mode other than the sulfur elimination mode has been requested (S124).

When the sulfur elimination mode is being executed or when the sulfur elimination mode has been requested (NO in step S124), the ECU 70 stops the PM elimination heating (step S134) and temporarily terminates this process. The PM elimination heating is stopped because a processing similar to the burn-up heating is performed in the sulfur elimination mode.

When a mode other than the sulfur elimination mode is being executed and the sulfur elimination mode is not requested (YES in step S124), the ECU 70 determines whether the ratio ΔP/GA of the pressure difference ΔP between the upstream and downstream sides of the filter 38a to the intake air amount GA is greater than or equal to a replacement reference value Dp (step S126). The ratio ΔP/GA corresponds to an exhaust pressure difference.

It is preferred that the ratio of the pressure difference ΔP to an exhaust flow amount be used instead of the ratio ΔP/GA to accurately reflect the actual driving state. However, the intake air amount GA is directly proportional to the exhaust flow amount. Thus, the use of the ratio ΔP/GA does not affect control accuracy.

Instead of comparing the ratio ΔP/GA with the value Dp, the pressure difference ΔP may be compared with a replacement reference value (e.g., Dp*GA) that is set larger in accordance with the exhaust flow amount (or the intake air amount GA). In this case, the pressure difference ΔP corresponds to the exhaust pressure difference.

When ΔP/GA is less than Dp (NO in step S126), the filter 38a is not clogged with PM, and the estimated accumulation amount PMsm is not deviated from the actual accumulation amount. In this case, the ECU 70 determines whether the estimated accumulation amount PMsm is less than or equal to the termination determination value PMend in step S136. In the initial stage of the regeneration control, PMsm is less than PMend (NO in step S136). Thus, the PM elimination heating is continued (step S142). In this case, as shown in FIG. 4, the estimated accumulation amount PMsm continues to degrease gradually after timing t1 in accordance with the calculation using the expression 1.

When the state in which ΔP/GA is less than Dp continues (NO in step S126) and the estimated accumulation amount PMsm decreases and satisfies PMsm≦PMend (0 grams) (YES in step S136, t2 in FIG. 4), the ECU 70 stops the PM elimination heating (step S138) and ends the regeneration mode (step S140). Then, the ECU 70 temporarily terminates this process. This completes the elimination of PM mainly trapped in the filter 38a. When the estimated accumulation amount PMsm increases to satisfy PMsm≧PMstart again (YES in step S108 of FIG. 2), the regeneration control is started again in the manner described above (step S112) unless the regeneration control is stopped by the sulfur elimination mode (YES in step S110).

The following describes a case in which the filter 38a is clogged with PM and the estimated accumulation amount PMsm is deviated from the actual accumulation amount. In this case, the ratio ΔP/GA becomes greater than or equal to the value Dp (YES in step S126) after the determination in step S122 results in YES and the determination in step S124 results in YES.

In step S128, the ECU 70 determines whether the number of times the determination in step S126 results in YES, that is, the number of times the ratio ΔP/GA is consecutively determined as greater than or equal to the value Dp (hereafter referred to as the "determination number") is less than or equal to a stop determination number Np (e.g., two). For example, when the determination number is smaller than the stop determination number Np such as when the determination in step S126 has been executed for the first time (YES in step S128), the ECU 70 replaces the estimated accumulation amount PMsm with a greater replacement amount UPpm (step S130) using expression 2.

$$PMsm \leftarrow UPpm \qquad (2)$$

The replacement amount UPpm is a fixed value, and UPpm is greater than BUpm.

Figure 5:
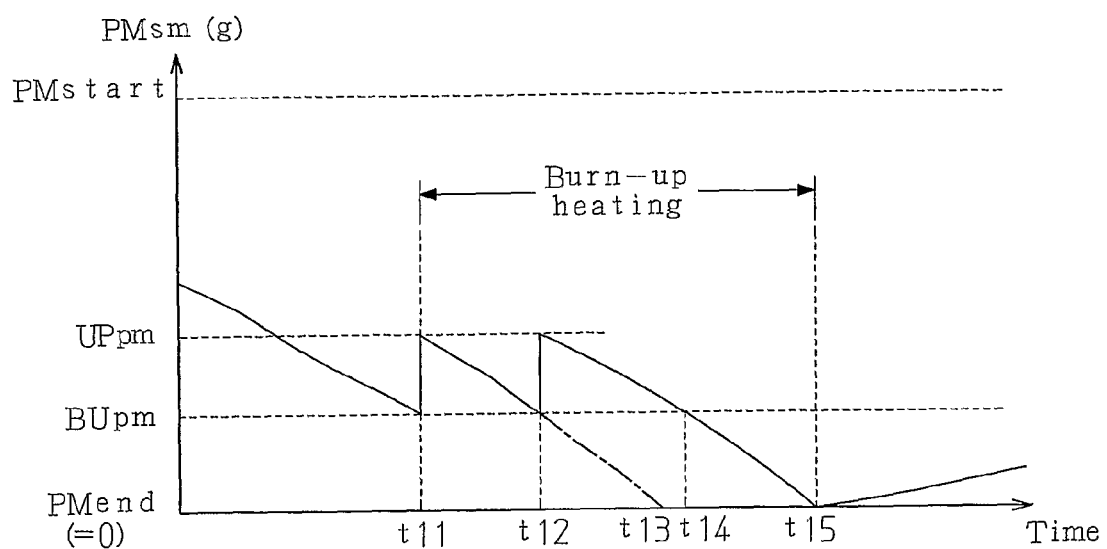

In this case, the estimated accumulation amount PMsm is increased to a value greater than the maximum value BUpm as shown in FIG. 5 (t11).

In step S132, the ECU 70 switches from the PM elimination heating to the burn-up heating and temporarily terminates this process. When burn-up heating is started, the PM clogging at the front surface of the NOx storage reduction catalyst 36a is eliminated, and the amount of PM accumulated in the filter 38a that is greater than the estimated accumulation amount PMsm is burned up. This reduces the deviation of the estimated accumulation amount PMsm from the actual accumulation amount. The estimated accumulation amount PMsm is once lowered to be less than or equal to the maximum value BUpm, which is slightly greater than the termination determination value PMend. Thus, even if the estimated accumulation amount PMsm deviates from the actual accumulation amount, the burn-up heating avoids a case in which a large amount of PM is burned rapidly.

In a period in which PMsm is greater than BUpm (NO in step S122), the burn-up type PM elimination heating is performed (step S142). When the estimated accumulation amount PMsm decreases to satisfy PMsm≦BUpm again (YES in step S122, t12 in FIG. 5) and ΔP/GA is less than Dp (NO in step S126) and PMsm is greater than PMend (NO in step S136), the PM elimination heating is continued as indicated by the broken line in FIG. 5 (step S142). When the estimated accumulation amount PMsm decreases to satisfy PMsm≦PMend (YES in step S136), the PM elimination heating is stopped (step S138), and the regeneration mode is completed (step S140, t13 in FIG. 5).

When ΔP/GA≧Dp is satisfied (YES in step S126), the ECU 70 determines whether the determination number in step S126 is less than or equal to the stop determination number Np (two) (step S128). For example, when the determination in step S126 is executed for the second time (YES in step S128), the ECU 70 replaces the estimated accumulation amount PMsm again with the replacement amount UPpm (step S130). As indicated by the broken line in FIG. 5, the estimated accumulation amount PMsm increases again to a value greater than the maximum value BUpm (t12).

The ECU 70 continues the burn-up heating (step S132), and temporarily terminates this process. The continued burn-up heating further reduces the deviation of the estimated accumulation amount PMsm from the actual accumulation amount.

In a period in which PMsm is greater than BUpm (NO in step S122), the ECU 70 continues the burn-up heating (step S142). When the estimated accumulation amount PMsm decreases to satisfy PMsm≧BUpm again (YES in step S122, t14 in FIG. 5), and when ΔP/GA is less than Dp (NO in step S126) and PMsm is greater than PMend (NO in step S136), the ECU 70 continues the burn-up type PM elimination heating (step S142). When the estimated accumulation amount PMsm decreases to satisfy PMsm≦PMend (YES in step S136, t15 in FIG. 5), the ECU 70 stops the PM elimination heating (step S138) and completes the regeneration mode (step S140).

When ΔP/GA≧Dp is satisfied (YES in step S126), the determination relating to the ratio ΔP/GA has been executed for the third time (NO in step S128). In this case, the ECU 70 executes the same processing as the processing executed when ΔP/GA is less than Dp. When the estimated accumulation amount PMsm decreases to satisfy PMsm≦PMend as indicated by the solid line in FIG. 5 (YES in step S136, t15 in FIG. 5), the ECU 70 stops the PM elimination heating (step S138), and completes the regeneration mode (step S140).

The pressure difference sensor 50 and the intake air amount sensor 24 serve as a difference detector. The ECU 70 executing steps S122, S124, S126, S128, and S130 serves as a replacement control section.

The first embodiment has the advantages described below.

(a) The flow resistance of the exhaust increases and the exhaust pressure difference ΔP/GA between the upstream and downstream sides of the filter 38a increases as the degree of the PM clogging in the filter 38a in the second catalytic converter 38 increases. When the estimated accumulation amount PMsm does not deviate from the actual accumulation amount, the exhaust pressure difference ΔP/GA corresponds to the estimated accumulation amount PMsm. Accordingly, the estimated accumulation amount PMsm is accurate if the exhaust pressure difference ΔP/GA detected by the pressure difference sensor 50 is a value corresponding to the replacement determination reference range (≦BUpm) when the estimated accumulation amount PMsm falls within the replacement determination reference range.

When the exhaust pressure difference ΔP/GA is greater than the replacement determination reference range, the actual accumulation amount is greater than the estimated accumulation amount PMsm. If such state continues, the regeneration mode is completed even though there is residual PM. When such residual PM elimination is accumulated, the deviation of the estimated accumulation amount PMsm from the actual accumulation amount gradually increases. This would lead to an amount of PM greater than intended to be burned rapidly. As a result, the filter 38a may become excessively heated and cause thermal deterioration of the filter 38a.

In the first embodiment, the ECU 70 compares the ratio ΔP/GA with the replacement reference value Dp when PMsm≦BUpm is satisfied to determine whether the estimated accumulation amount PMsm is deviated from the actual accumulation amount. When ΔP/GA≧Dp is satisfied, the ECU 70 replaces the estimated accumulation amount PMsm with the replacement amount UPpm. This causes the estimated accumulation amount PMsm to approach or be the same as the actual accumulation amount.

In this way, the difference between the estimated accumulation amount PMsm and the actual accumulation amount is minimized so that the PM accumulated in the filter 38a is appropriately eliminated. This prevents a large amount of PM from being rapidly burned.

(b) The replacement determination reference range defined using the maximum value BUpm is set in a range defined by the estimated accumulation amount PMsm immediately before the regeneration mode is completed. The actual PM accumulation amount is sufficiently reduced by executing normal heating for PM elimination. Thus, even when burn-up heating is performed to burn up all of the PM at the same time, a state in which the burn-up heating rapidly burns a large amount of PM is avoided. Thus, even with such special heating, the filter 38a is not excessively heated and thermal deterioration of the filter 38a does not occur. Hence, the accumulated particulate matter is appropriately eliminated.

(c) When the increased estimated accumulation amount PMsm falls within the replacement determination reference range again and ΔP/GA≧Dp is satisfied, the ECU 70 repeats the replacement of the estimated accumulation amount PMsm. Thus, even when compensation for the deviation of the estimated accumulation amount PMsm in the previous cycle from the actual accumulation amount is insufficient, repeated replacement of the estimated accumulation amount PMsm almost completely eliminates the deviation of the estimated accumulation amount PMsm from the actual accumulation amount.

(d) The presence of non-combustible materials, such as ash, may cause a state in which ΔP/GA≧Dp is satisfied to continue. In this case, repeatedly replacing the estimated accumulation amount PMsm to extend the regeneration mode may lower fuel efficiency. Thus, the ECU 70 limits the number of times the estimated accumulation amount PMsm is replaced to prevent the fuel efficiency from decreasing. In this embodiment, the stop determination number Np is set as two so that the replacement of the estimated accumulation amount PMsm is not executed three consecutive times.

(e) The sulfur elimination mode has the same effect as the effect of the burn-up heating. Thus, even when the estimated accumulation amount PMsm deviates from the actual accumulation amount, the deviation is reduced or eliminated in the sulfur elimination mode. Thus, the ECU 70 does not execute the replacement of the estimated accumulation amount PMsm in the sulfur elimination mode. In this way, the regeneration mode, particularly the burn-up heating, is not often executed to prevent the fuel efficiency from decreasing.

A regeneration controller for an exhaust purification apparatus of an internal combustion engine according to a second embodiment of the present invention will now be described.

In the second embodiment, the exhaust temperature difference thco−thci between the upstream and downstream sides of the filter 38a, which corresponds to a downstream exhaust purification mechanism, is used in lieu of the exhaust pressure difference ΔP/GA. In step S126 of the regeneration control shown in FIG. 3, the ECU 70 determines whether the exhaust temperature difference thco−thci is greater than or equal to the replacement reference value Dth instead of determining whether ΔP/GA≧Dp is satisfied. In step S128, the ECU 70 executes the determination relating to the determination number of the exhaust temperature difference. The other parts are the same as the first embodiment.

The first exhaust temperature sensor 44 and the second exhaust temperature sensor 46 serve as a difference detector.

The second embodiment has the advantages described below.

(a) When the NOx storage reduction catalyst 36a (upstream exhaust purification mechanism) is clogged with PM before the filter 38a is clogged with PM, the exhaust passes through only a limited portion of the NOx storage reduction catalyst 36a during the regeneration control. Thus, the reaction heat of the NOx storage reduction catalyst 36a is insufficient, and reaction heat is unevenly generated in the downstream filter 38a.

Accordingly, in the second embodiment, the exhaust temperature difference thco−thci between the upstream and downstream sides of the filter 38a is used in lieu of the exhaust pressure difference ΔP/GA. The ECU 70 replaces the estimated accumulation amount PMsm when the temperature difference is greater than or equal to the replacement reference value Dth. This causes the estimated accumulation amount PMsm to approach or to be the same as the actual accumulation amount.

In this way, the difference between the estimated accumulation amount PMsm and the actual accumulation amount is minimized so that the accumulated PM is appropriately eliminated. This prevents rapid burning of a large amount of PM.

(b) The second embodiment also has advantages (b) to (e) described in the first embodiment.

A regeneration controller for an exhaust purification apparatus of an internal combustion engine according to a third embodiment of the present invention will now be discussed.

Figure 6:
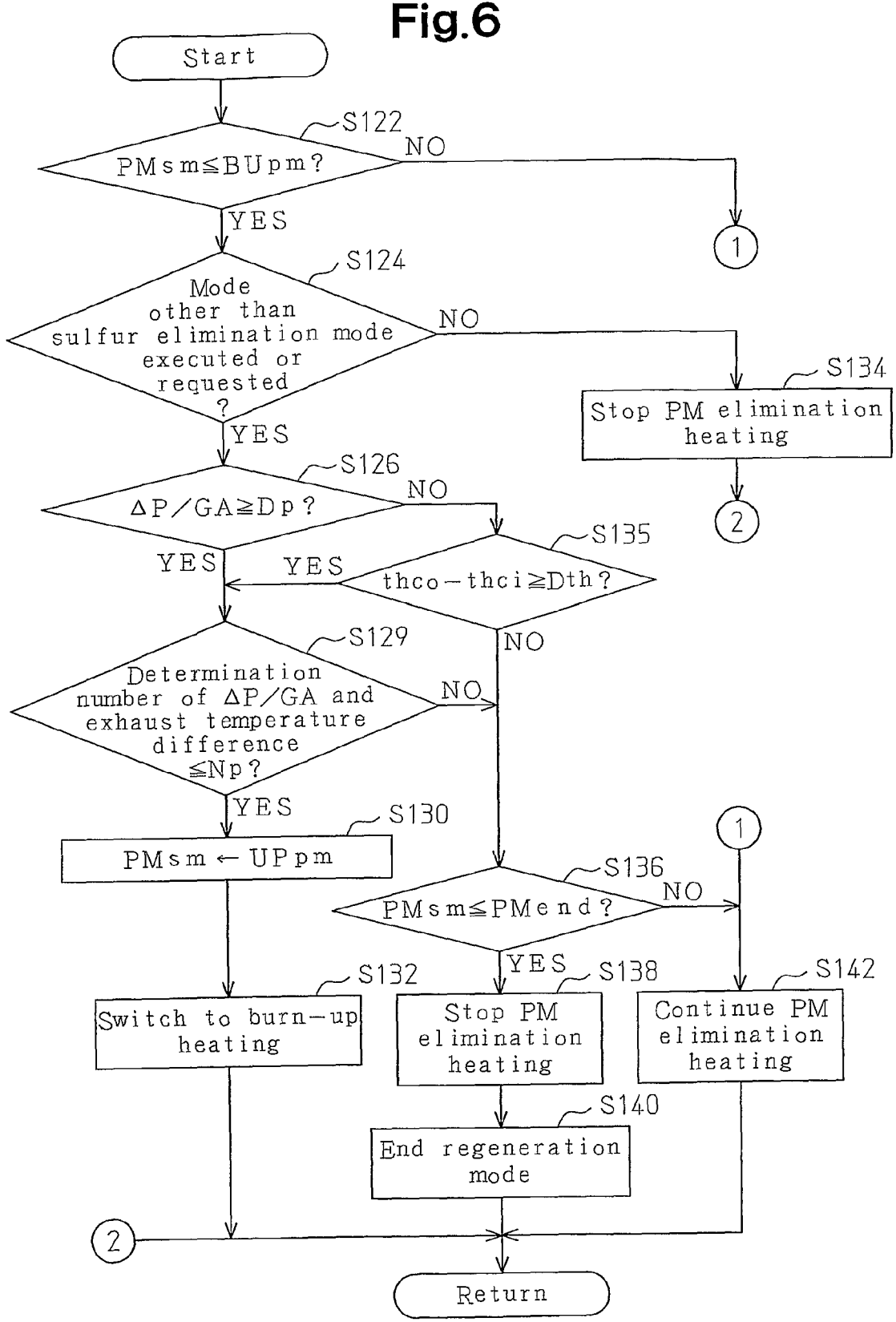
FIG. 6 is a flowchart of regeneration control according to a third embodiment of the present invention.

In the third embodiment, when the exhaust pressure difference ΔP/GA is smaller than the value Dp as shown in the flowchart of FIG. 6 (NO in step S126), the ECU 70 determines whether the exhaust temperature difference thco−thci between the upstream and downstream sides of the filter 38a is greater than or equal to the replacement reference value Dth (step S135).

When ΔP/GA≧Dp is satisfied (YES in step S126) or thco−thci≧Dth is satisfied (YES in step S135), and when the number of times the determination in step S126 or S135 consecutively results in YES (hereafter referred to as the "determination number") is less than or equal to the stop determination number Np (YES in step S129), the ECU 70 replaces the estimated accumulation amount PMsm with the replacement amount UPpm (step S130).

The other processing executed by the regeneration controller of the second embodiment is the same as the corresponding processing shown in FIG. 3. The steps in FIG. 6 that are identical to the steps in FIG. 3 are given the same reference numeral as those steps.

The pressure difference sensor 50, the intake air amount sensor 24, the first exhaust temperature sensor 44, and the second exhaust temperature sensor 46 serve as a difference detector. The ECU 70 executing the regeneration control (FIG. 6) in steps S122, S124, S126, S135, S129, and S130 serves as a replacement control section.

The third embodiment has the advantages described below.

(a) The advantages described in the first and second embodiments are obtained. In particular, not only the exhaust pressure difference ΔP/GA between the upstream and downstream sides of the filter 38a but also the exhaust temperature difference thco−thci between the upstream and downstream sides of the filter 38a is used. Thus, the difference between the estimated accumulation amount PMsm and the actual accumulation amount is minimized so that the accumulated PM is appropriately eliminated. This reliably prevents rapid burning of a large amount of PM.

A regeneration controller for an exhaust purification apparatus of an internal combustion engine according to a fourth embodiment of the present invention will now be described.

Figure 7:
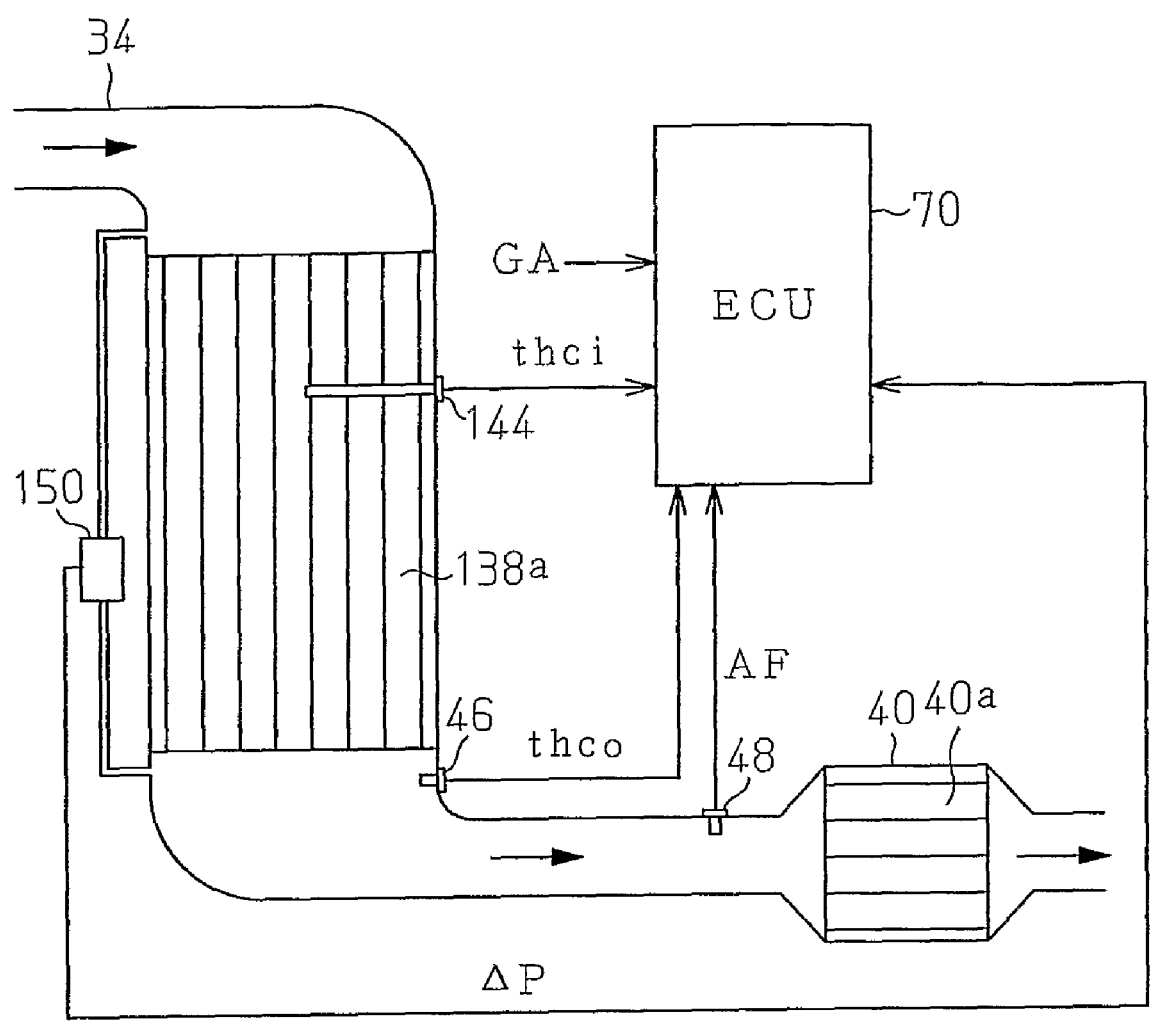
FIG. 7 is a schematic diagram of an exhaust purification apparatus according to a fourth embodiment of the present invention.

In the fourth embodiment, referring to FIG. 7, a single filter 138a having a base coated with a layer of NOx storage reduction catalyst is used instead of the two catalytic converters described in the first embodiment, namely, the first catalytic converter and the second catalytic converter. A pressure difference sensor 150 detects the pressure difference ΔP between the upstream and downstream sides of the filter 138a. A first exhaust temperature sensor 144 detects the temperature (exhaust temperature thci) of the exhaust within the filter 138a. A second exhaust temperature sensor 46, an air-fuel ratio sensor 48, a third catalytic converter 40, and an oxidation catalyst 40a are identical to the corresponding components in the first embodiment, and are given the same reference numerals as those components.

The pressure difference sensor 150 detects the exhaust pressure difference ΔP/GA between the upstream and downstream sides of the exhaust purification apparatus. The first exhaust temperature sensor 144 detects the temperature of the exhaust in the filter 138a. The second exhaust temperature sensor 46 detects the temperature of the exhaust in the vicinity of the outlet of the filter 138a. Accordingly, the first and second exhaust temperature sensors 144 and 46 detect the exhaust temperature difference thco−thci at a relatively downstream portion of the exhaust purification apparatus.

The pressure difference sensor 150, the intake air amount sensor 24, the first exhaust temperature sensor 144, and the second exhaust temperature sensor 46 function as the difference detector.

The regeneration mode execution determination and the regeneration control described in one of the first to third embodiments are executed.

The fourth embodiment has the advantages described below.

(a) The catalyst arrangement according to the fourth embodiment also minimizes the difference between the estimated accumulation amount PMsm and the actual accumulation amount so that the accumulated PM is appropriately eliminated. This prevents a large amount of PM from being rapidly burned.

A regeneration controller for an exhaust purification apparatus of an internal combustion engine according to a fifth embodiment of the present invention will now be described.

Figure 8:
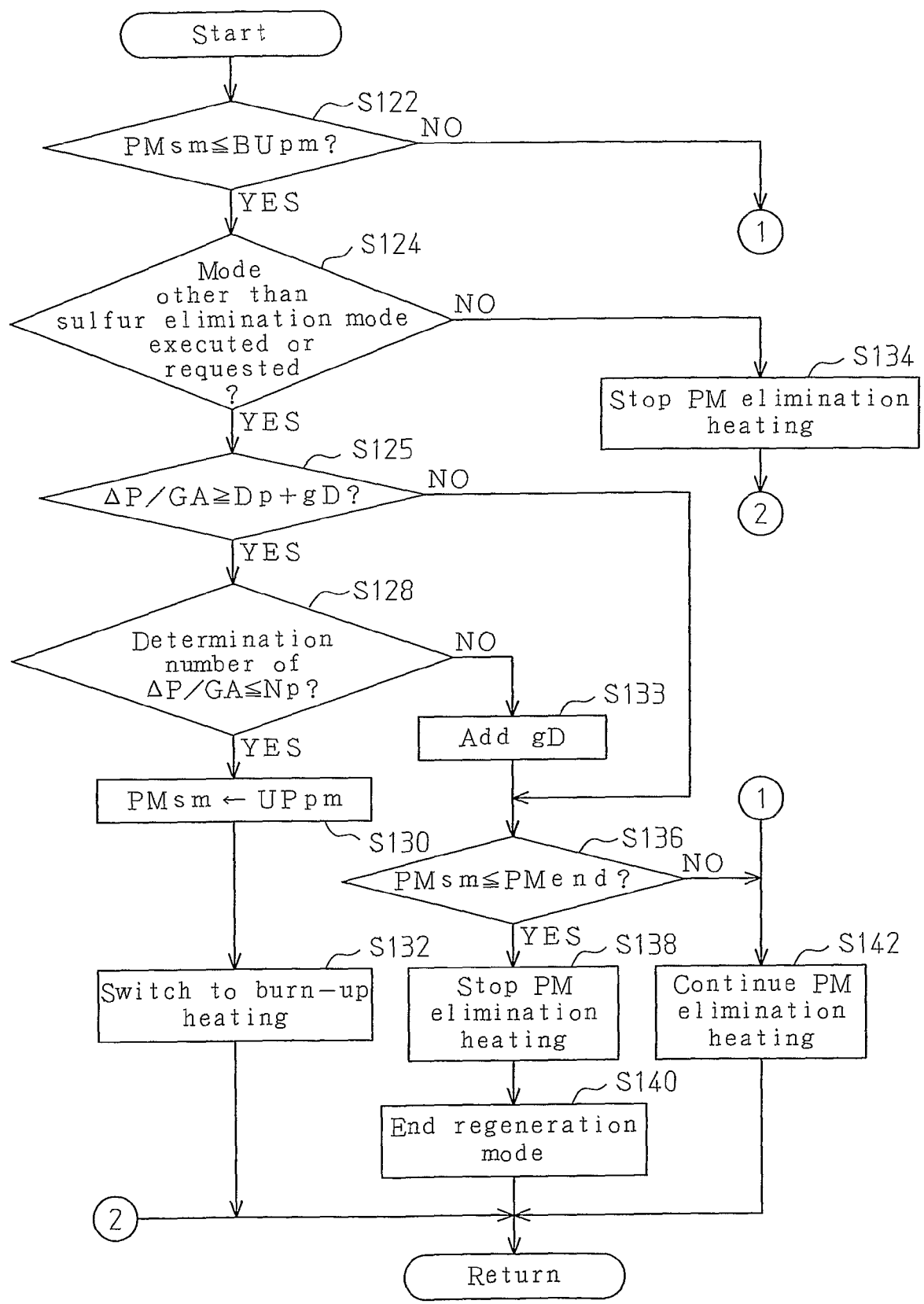
FIG. 8 is a flowchart of regeneration control according to a fifth embodiment of the present invention.

In the fifth embodiment, regeneration control shown in FIG. 8 is executed. The other parts are the same as the first embodiment.

In step S125 of FIG. 8, the ECU 70 checks whether the exhaust pressure difference ΔP/GA satisfies expression 3.

$$\Delta P/GA \geq Dp + gD \qquad (3)$$

In expression 3, a correction value gD is increased (step S133) when the determination number of the exhaust pressure difference ΔP/GA exceeds the stop determination number Np (NO in step S128). The flowchart of FIG. 8 differs from that of FIG. 3 only in the correction value gD.

When the expression 3 is satisfied after the replacement of the estimated accumulation amount PMsm (step S130) is repeated for a number of times exceeding the stop determination number Np (NO in step S128), it is assumed that non-combustible materials such as ash have accumulated. In this case, the accumulation of such non-combustible materials is taken in consideration by increasing the correction value gD. The increased correction value gD is added to the replacement reference value Dp at step S125 in next routine. This improves the accuracy of the determination relating to the PM accumulation state, which is based on the exhaust pressure difference ΔP/GA.

The increasing value by which the correction value gD is increased in step S133 may be a fixed value. The increasing value of the correction value gD may also be a value resulting from (ΔP/GA)−(Dp+gD) whose values are used in the preceding determination in step S125 or a value calculated based on the value resulting from (ΔP/GA)−(Dp+gD).

The ECU 70 incrementing the correction value gD in step S133 serves as a correction control section.

The fifth embodiment has the advantages described below.

(a) In addition to the advantages described in the first embodiment, the fifth embodiment enables the control considering accumulation of non-combustible materials such as ash. The deviation of the estimated accumulation amount PMsm from the actual accumulation amount is reduced more appropriately so that the accumulated PM is appropriately eliminated.

A regeneration controller for an exhaust purification apparatus of an internal combustion engine according to a sixth embodiment of the present invention will now be described.

Figure 9:
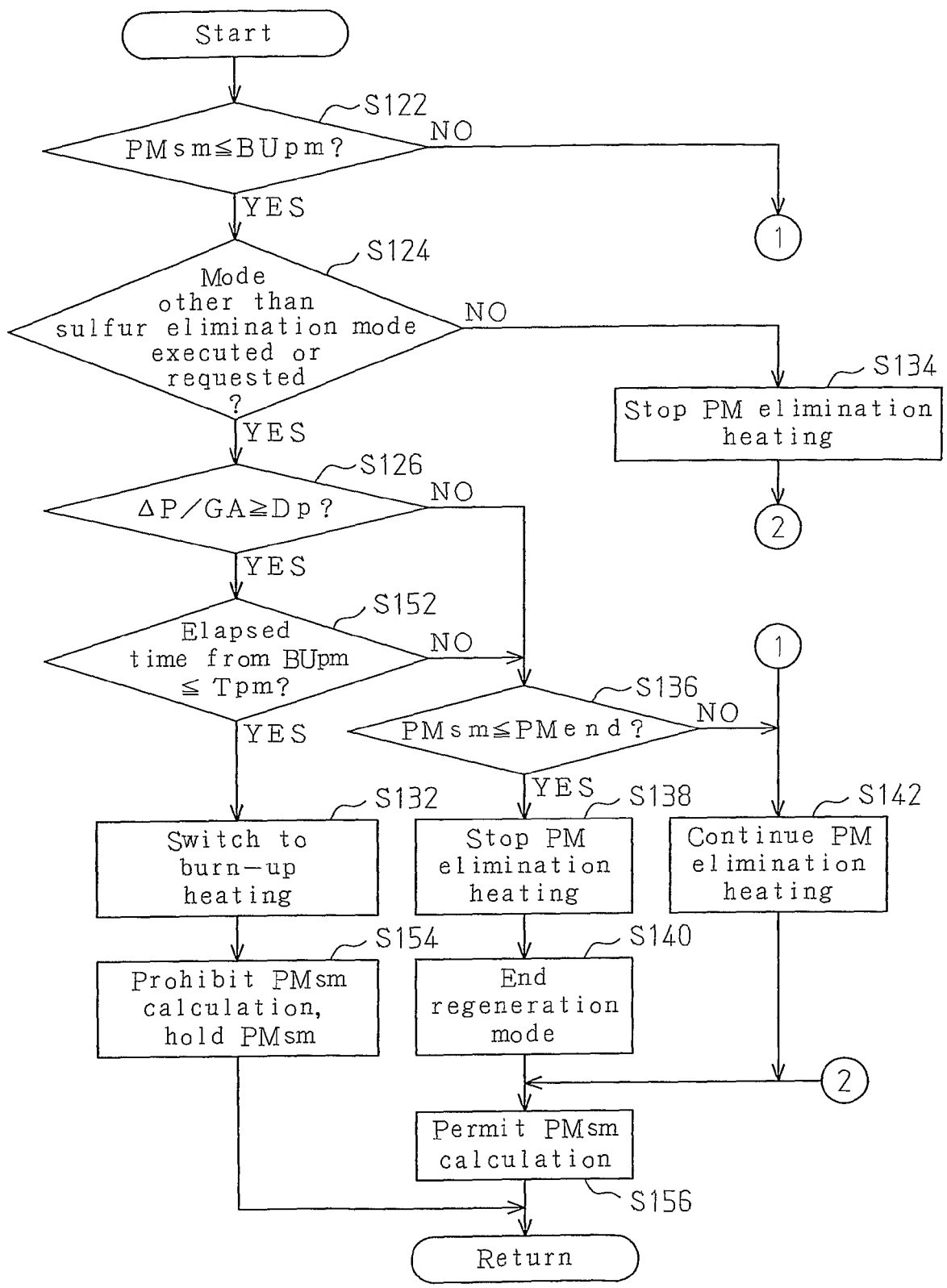
FIG. 9 is a flowchart of regeneration control according to a sixth embodiment of the present invention.

In the sixth embodiment, the ECU 70 executes the regeneration control shown in FIG. 9 instead of the regeneration control shown in FIG. 3. The other parts of the sixth embodiment are the same as the first embodiment.

In the flowchart of FIG. 9, step S152 is executed instead of step S128 of FIG. 3. In step S152, the ECU 70 determines whether the time elapsed from when the estimated accumulation amount PMsm reaches the maximum value BUpm is less than or equal to a stop determination period Tpm. When the determination result in step S152 is YES, the estimated accumulation amount PMsm is not replaced. In this case, the calculation of the estimated accumulation amount PMsm is prohibited, and the value of the estimated accumulation amount PMsm calculated previously is held (step S154). When the processing in step S154 is executed, the calculation of the estimated accumulation amount PMsm in step S106 in FIG. 2 is not executed, and the value of the estimated accumulation amount PMsm calculated in the previous process is held.

After steps S134, S140, and S142, the calculation of the estimated accumulation amount PMsm is permitted in step S156. Then, the calculation (update) of the estimated accumulation amount PMsm in step S106 is resumed using the held value of the estimated accumulation amount PMsm.

Figure 10:
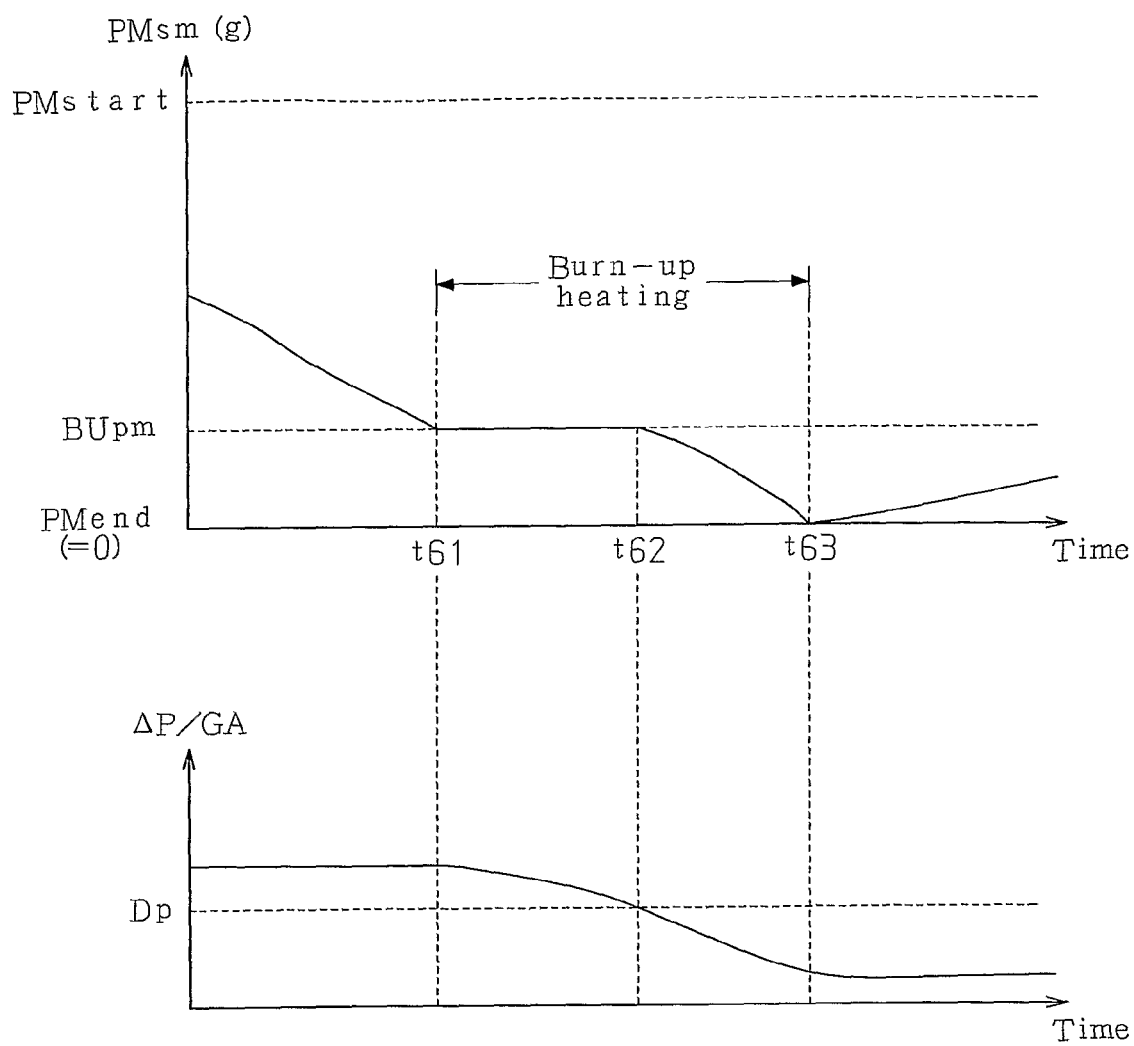
FIG. 10 is a timing chart of regeneration control according to the sixth embodiment.

When the estimated accumulation amount PMsm decreases to satisfy PMsm≦BUpm (YES in step S122), the determination results in steps S124 and S126 are YES, and the elapsed time does not reach the stop determination period Tpm (YES in step S152), the calculation of the estimated accumulation amount PMsm is prohibited and the value of the estimated accumulation amount PMsm calculated previously is held after step S132 (step S154). Thus, the estimated accumulation amount PMsm is held at a fixed value (t61 to t62) as shown in the timing chart of FIG. 10. When ΔP/GA is less than Dp (NO in step S126) or when the elapsed time reaches the stop determination period Tpm (NO in step S152), the estimated accumulation amount PMsm continuously decreases again by the execution of steps S136 and S142 (subsequent to t62). When the estimated accumulation amount PMsm decreases to satisfy PMsm≦PMend (YES in step S136), the PM elimination heating is stopped (step S138), the regeneration mode is completed (step S140), and the calculation of the estimated accumulation amount PMsm is permitted (step S156, t63 in FIG. 10).

The pressure difference sensor 50 and the intake air amount sensor 24 serve as a difference detector. The ECU 70 executing the regeneration control (FIG. 9) in steps S122, S126, S152, and S154 serves as a hold control section.

The sixth embodiment has the advantages described below.

(a) In the sixth embodiment, the value of the estimated accumulation amount PMsm is held and not replaced. After that, the PM elimination heating is continuously executed. This enables the estimated accumulation amount PMsm to approach or to be the same as the actual accumulation amount. When the exhaust pressure difference ΔP/GA becomes smaller than the held reference value Dp, the deviation of the estimated accumulation amount PMsm from the actual accumulation amount is reduced to be small or to be eliminated. In this way, the difference between the estimated accumulation amount PMsm and the actual accumulation amount is minimized so that the accumulated PM is appropriately eliminated. This prevents a large amount of PM from rapidly burning.

(b) The presence of non-combustible materials such as ash may cause the exhaust pressure difference ΔP/GA to be continuously greater than the held reference value Dp. In such a case, if the estimated accumulation amount PMsm is continuously held to extend the PM elimination heating, this may lower fuel efficiency. Thus, when a period in which the estimated accumulation amount PM is held reaches the stop determination period Tpm, the value of the estimated accumulation amount PMsm is not held thereafter in the PM elimination heating. This prevents the fuel efficiency from being lowered.

(c) Advantage (b) of the first embodiment is obtained.

A regeneration controller for an exhaust purification apparatus of an internal combustion engine according to a seventh embodiment of the present invention will now be described.

Figure 11:
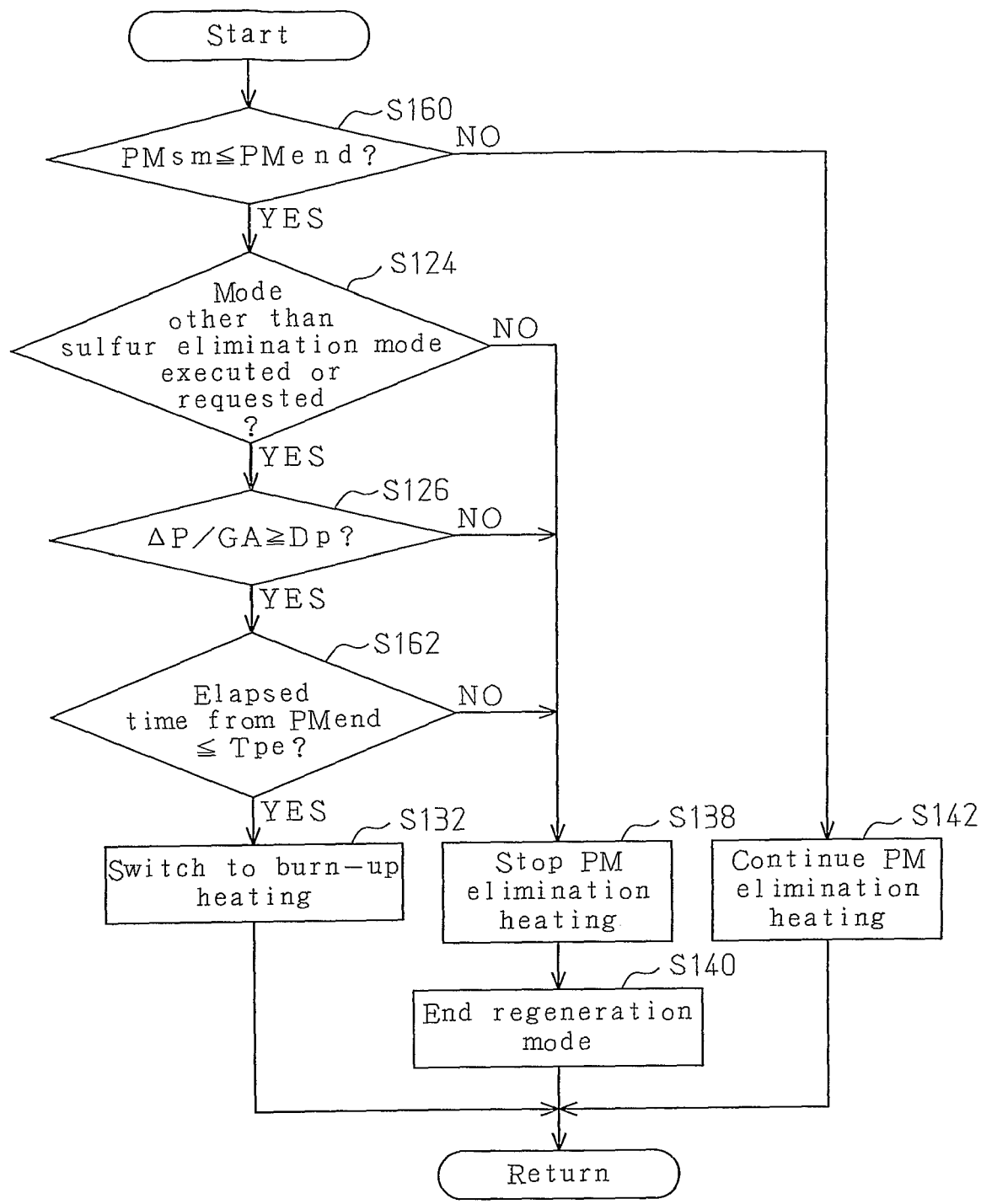
FIG. 11 is a flowchart of regeneration control according to a seventh embodiment of the present invention.

In the seventh embodiment, the ECU 70 executes the regeneration control shown in FIG. 11 instead of the regeneration control shown in FIG. 3. The other parts of the seventh embodiment are the same as the first embodiment.

In the flowchart of FIG. 11, step S160 is executed instead of step S122 in FIG. 3. In step S160, the ECU 70 determines whether the estimated accumulation amount PMsm is less than or equal to the stop determination value PMend. When the determination result in step S160 is NO, the ECU 70 executes or continues the burn-up type PM elimination heating (step S142).

When the determination result in step S160 is YES, and the determination result in any of steps S124, S126, and S162 is NO, the ECU 70 immediately stops the PM elimination heating (step S138) and completes the regeneration mode (step S140).

When the determination results in all of steps S124, S126, and S162 are YES, the ECU 70 switches to or continues the burn-up type burning (step S132) and does not replace the estimated accumulation amount PMsm. In step S162, the ECU 70 determines whether the time elapsed from when the estimated accumulation amount PMsm decreases to satisfy PMsm≦PMend reaches a stop determination period Tpe (step S162). The steps in FIG. 11 that are identical to the steps in FIG. 3 are given the same reference numerals as those steps.

Figure 12:
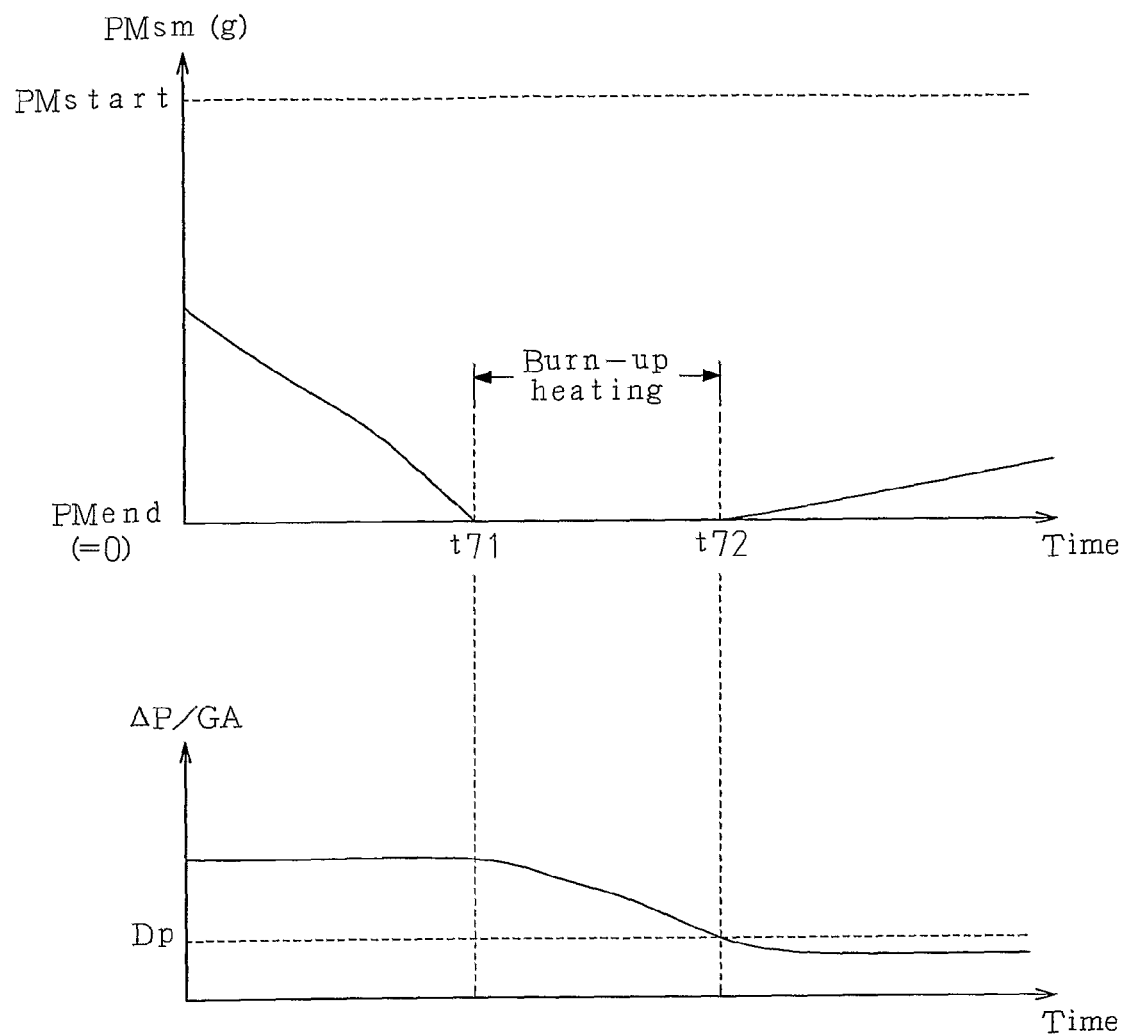
FIG. 12 is a timing chart of regeneration control according to the seventh embodiment.

As shown in the timing chart of FIG. 12, the regeneration control shown in FIG. 11 causes the burn-up heating to be executed after the estimated accumulation amount PMsm reaches the termination determination value PMend (e.g., 0 grams) (subsequent to t71). For example, when ΔP/GA is less than Dp (where Dp is a continuance reference value) (t72), the PM elimination heating is stopped, and the regeneration mode is completed.

The pressure difference sensor 50 and the intake air amount sensor 24 serve as a difference detector. The ECU 70 executing the regeneration control (FIG. 11) in steps S160, S126, and S162 serves as a particulate matter elimination continuation control section.

The seventh embodiment has the advantages described below.

(a) In a period in which ΔP/GA≧Dp is satisfied and the estimated accumulation amount PMsm reaches the reference value for determining whether the PM elimination heating is to be completed, that is, reaches the termination determination value PMend, the ECU 70 continues the PM elimination heating. This causes the estimated accumulation amount PMsm to approach or to be the same as the actual accumulation amount. When ΔP/GA is less than Dp, the deviation of the estimated accumulation amount PMsm from the actual accumulation amount is small or is eliminated. Further, this is the timing at which the PM elimination heating is to be completed. Thus, the ECU 70 completes the PM elimination heating.

In this way, the difference between the estimated accumulation amount PMsm and the actual accumulation amount is minimized so that the accumulated PM is appropriately eliminated. This prevents a large amount of PM from rapidly burning.

(b) The advantages (d) and (e) described in the first embodiment are obtained.

It should be apparent to those skilled in the art that the present invention may be embodied in many other specific forms without departing from the spirit or scope of the invention. Particularly, it should be understood that the present invention may be embodied in the following forms.

(1) In the above embodiments, burn-up heating is performed when the determination relating to the exhaust pressure difference ΔP/GA or the determination relating to the exhaust temperature difference thco−tchi results in YES. However, normal PM elimination heating may be continued instead of switching to such special heating.

(2) In FIGS. 9 and 11, instead of the determination of the exhaust pressure difference ΔP/GA (step S126), the determination as to whether the exhaust temperature difference thco−tchi is greater than or equal to the replacement reference value Dth may be executed in the same manner as in the second embodiment. Alternatively, a logical OR relationship of the determination relating to the exhaust pressure difference ΔP/GA (step S126 in FIG. 6) and the determination relating to the exhaust temperature difference thco−tchi (step S135 in FIG. 6) may be used in the same manner as in the third embodiment. In such cases, the advantages described in the above embodiments are obtained.

When the determination result in step S162 in FIG. 11 is YES, the processing for replacing the estimated accumulation amount PMsm with a value greater than zero may be additionally executed.

(3) In the above embodiments, the exhaust flow amount may be calculated from a driving state of the diesel engine 2, for example, from the engine speed NE and the fuel injection amount using a map instead of detecting the intake air amount GA using the intake air amount sensor 24. The calculated exhaust flow amount may be used in various processing including the calculation of the exhaust pressure difference ΔP/GA.

(4) In FIGS. 3, 6, and 8, the value of the replacement amount UPpm at the first replacement of the estimated accumulation amount PMsm and the value of the replacement amount UPpm at the second replacement are the same. The value of the replacement amount UPpm may be changed according to the number of times the replacement is repeated. For example, the value of the replacement amount UPpm for the first replacement may be smaller than the value of the replacement amount UPpm for the second replacement.

The present examples and embodiments are to be considered as illustrative and not restrictive, and the invention is not to be limited to the details given herein, but may be modified within the scope and equivalence of the appended claims.

The invention claimed is:

1. A regeneration controller for regenerating an exhaust purification apparatus that is arranged in an exhaust passage for an internal combustion engine, wherein the exhaust purification apparatus includes an upstream purification mechanism and a downstream purification mechanism that are arranged in the exhaust passage, the regeneration controller comprising:

a difference detector for detecting at least one of a difference in exhaust pressure and a difference in exhaust temperature between an upstream location and a downstream location of the downstream purification mechanism;

a calculation section for calculating an estimated accumulation amount of particulate matter in the exhaust purification apparatus, wherein the estimated accumulation amount of particulate matter is calculated using at least an exhaust temperature taken at the downstream location of the downstream purification mechanism;

a heating control section for heating the exhaust purification apparatus to eliminate the particulate matter from the exhaust purification apparatus when the estimated accumulation amount is greater than a reference accumulation amount; and a replacement control section for replacing the estimated accumulation amount with a greater estimated accumulation amount when the estimated accumulation amount falls within a replacement determination reference range due to the heating and the at least one difference is greater than a replacement reference value.

2. The regeneration controller according to claim 1, wherein the regeneration controller is provided with a sulfur elimination mode for restoring the exhaust purification apparatus from sulfur poisoning by releasing sulfur components from the exhaust purification apparatus, and the replacement control section refrains from replacing the estimated accumulation amount when the regeneration controller is in the sulfur elimination mode or when the sulfur elimination mode is requested.

3. The regeneration controller according to claim 1, wherein the replacement determination reference range includes a value equal to the accumulation amount of particulate matter in the exhaust purification apparatus immediately before the heating is completed.

4. The regeneration controller according to claim 1, wherein a maximum value of the replacement determination reference range is equal to the accumulation amount of particulate matter in the exhaust purification apparatus when the heating is completed.

5. The regeneration controller according to claim 1, wherein the regeneration controller is provided with a sulfur elimination mode for restoring the exhaust purification apparatus from sulfur poisoning by releasing sulfur components from the exhaust purification apparatus, and the replacement control section refrains from replacing the estimated accumulation amount when the regeneration controller is in the sulfur elimination mode or when the sulfur elimination mode is requested.

6. The regeneration controller according to claim 1, wherein the exhaust purification apparatus is a catalytic converter including a base coated with a layer of NOx storage reduction catalyst, the base being formed to filter particulate matter contained in exhaust.

7. The regeneration controller according to claim 1, wherein the exhaust purification apparatus includes:
   a NOx storage reduction catalyst device; and
   a filter, arranged downstream from the NOx storage reduction catalyst device and having a layer of NOx storage reduction catalyst, for filtering particulate matter contained in exhaust.

8. An electronic control unit serving as the calculation section, the heating control section, and the replacement control section according to claim 1.

9. The regeneration controller according to claim 1, wherein when an estimated accumulation amount obtained by calculation that is resumed, using the replaced estimated accumulation amount, falls within the replacement determination reference range again and the at least one difference is greater than the replacement reference value, the replacement control section repeats the replacement of the estimated accumulation amount.

10. The regeneration controller according to claim 9, wherein when a state in which the at least one difference is greater than the replacement reference value continues and the number of times the estimated accumulation amount is replaced reaches a stop determination number, the replacement control section refrains from executing the replacement of the estimated accumulation amount until the presently performed heating is completed.

11. The regeneration controller according to claim 10, further comprising:
   a correction control section for correcting the replacement reference value to generate a corrected reference value that is used for subsequent heating when a state in which the difference in exhaust pressure is greater than the replacement reference value continues and the number of times the estimated accumulation amount is replaced reaches the stop determination number.

12. The regeneration controller according to claim 11, wherein the correction control section increases the replacement reference value based on the value of the difference in the exhaust pressure when the number of times the estimated accumulation amount is replaced reaches the stop determination number.

13. A regeneration controller for regenerating an exhaust purification apparatus that is arranged in an exhaust passage for an internal combustion engine, wherein the exhaust purification apparatus includes an upstream purification portion and a downstream purification portion, the regeneration controller comprising:
   a difference detector for detecting at least one of a difference in exhaust pressure, between a first location upstream from the exhaust purification apparatus and a second location downstream from the exhaust purification apparatus, and a difference in exhaust temperature, between a third location upstream from the downstream purification portion of the exhaust purification apparatus and a fourth location downstream from the third location;
   a calculation section for calculating an estimated accumulation amount of particulate matter in the exhaust purification apparatus, wherein the estimated accumulation amount of particulate matter is calculated using at least an exhaust temperature taken at the fourth location and an air intake amount;
   a heating control section for heating the exhaust purification apparatus to eliminate the particulate matter from the exhaust purification apparatus when the estimated accumulation amount is greater than a reference accumulation amount; and
   a replacement control section for replacing the estimated accumulation amount with a greater estimated accumulation amount when the estimated accumulation amount falls within a replacement determination reference range due to the heating and the at least one difference is greater than a replacement reference value.

14. The regeneration controller according to claim 13, wherein the replacement determination reference range includes a value equal to the accumulation amount of particulate matter in the exhaust purification apparatus immediately before the heating is completed.

15. The regeneration controller according to claim 13, wherein a maximum value of the replacement determination reference range is equal to the accumulation amount of particulate matter in the exhaust purification apparatus when the heating is completed.

16. An electronic control unit serving as the calculation section, the heating control section, and the replacement control section according to claim 13.

17. The regeneration controller according to claim 13, wherein the exhaust purification apparatus is a catalytic converter including a base coated with a layer of NOx storage reduction catalyst, the base being formed to filter particulate matter contained in exhaust.

18. The regeneration controller according to claim 13, wherein the exhaust purification apparatus includes:
   a NOx storage reduction catalyst device; and
   a filter, arranged downstream from the NOx storage reduction catalyst device and having a layer of NOx storage reduction catalyst, for filtering particulate matter contained in exhaust.

19. The regeneration controller according to claim 13, wherein the third location is located in the exhaust purification apparatus, and the fourth location is downstream from the exhaust purification apparatus.

20. The regeneration controller according to claim 13, wherein when an estimated accumulation amount obtained by calculation that is resumed, using the replaced estimated accumulation amount, falls within the replacement determination reference range again and the at least one difference is greater than the replacement reference value, the replacement control section repeats the replacement of the estimated accumulation amount.

21. The regeneration controller according to claim 20, wherein when a state in which the at least one difference is greater than the replacement reference value continues and the number of times the estimated accumulation amount is replaced reaches a stop determination number, the replacement control section refrains from executing the replacement of the estimated accumulation amount until the presently performed heating is completed.

22. The regeneration controller according to claim 21, further comprising:
a correction control section for correcting the replacement reference value to generate a corrected reference value that is used for subsequent heating when a state in which the difference in exhaust pressure is greater than the replacement reference value continues and the number of times the estimated accumulation amount is replaced reaches the stop determination number.

23. The regeneration controller according to claim 22, wherein the correction control section increases the replacement reference value based on the value of the difference in the exhaust pressure when the number of times the estimated accumulation amount is replaced reaches the stop determination number.

* * * * *